(12) United States Patent
Agarwal et al.

(10) Patent No.: US 10,579,371 B2
(45) Date of Patent: Mar. 3, 2020

(54) RECOMMENDATIONS FOR CUSTOM SOFTWARE UPGRADE BY COGNITIVE TECHNOLOGIES

(71) Applicant: International Business Machines Corporation, Armonk, NY (US)

(72) Inventors: Pulkit Agarwal, Banaswadi (IN); Santanu Chakrabarty, Bangalore (IN); Sivaranjani Kathirvel, Dharapuram (IN); Sivaraj Sethunamasivayam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/840,642

(22) Filed: Dec. 13, 2017

(65) Prior Publication Data
US 2019/0179633 A1    Jun. 13, 2019

(51) Int. Cl.
*G06F 8/73* (2018.01)
*G06F 17/27* (2006.01)
(Continued)

(52) U.S. Cl.
CPC .................. *G06F 8/73* (2013.01); *G06F 8/71* (2013.01); *G06F 17/2785* (2013.01); *G06F 8/65* (2013.01); *G06F 17/277* (2013.01)

(58) Field of Classification Search
CPC .......... G06F 8/73; G06F 17/2785; G06F 8/65; G06F 8/71; G06F 17/277
(Continued)

(56) References Cited

U.S. PATENT DOCUMENTS 8,112,412 B1   2/2012 Nachenberg
8,209,350 B1*  6/2012 Johnson ................... G06F 8/73
                                              707/793
(Continued)

OTHER PUBLICATIONS

Zhao et al, "Automated Recommendation of Dynamic Software Update Points: An Exploratory Study", [Online], 2014, pp. 136-144, [Retrieved from internet on May 17, 2019], <http://delivery.acm.org/10.1145/2680000/2677853/p136-zhao.pdf?ip=151.207.250.22&id=2677853&acc=ACTIVE%20SERVICE&key=C15944E53D0ACA63> (Year: 2014).*
(Continued)

*Primary Examiner* — S. Sough
*Assistant Examiner* — Zengpu Wei
(74) *Attorney, Agent, or Firm* — North Shore Patents, P.C.; Michele Liu Baillie (57) ABSTRACT

In creating recommendations for software upgrades in a computing system, a natural language processing module of a software upgrade analyzer system receives risk analysis reports and a corresponding current application source code. The natural language processing module processes the risk analysis report and the current application source code to identify an application programming interface (API) key set containing key terms. A support vector machine of the software upgrade analyzer system identifies key terms in the API key set. An association rule mining module of the software upgrade analyzer system calculates a support factor and a confidence factor for each key term combination of the key terms. The association rule mining module identifies a highest ranking key term combination based on the confidence factor for each key term combination. The software upgrade analyzer system outputs the highest ranking key term combination as a software upgrade recommendation.

14 Claims, 6 Drawing Sheets

(51) Int. Cl.
*G06F 8/65* (2018.01)
*G06F 8/71* (2018.01)

(58) Field of Classification Search
USPC .......................................................... 717/123
See application file for complete search history.

(56) References Cited

U.S. PATENT DOCUMENTS

| | | | |
|---|---|---|---|
| 9,323,520 B2* | 4/2016 | Misra | G06F 8/74 |
| 9,361,068 B2 | 6/2016 | Frenkiel et al. | |
| 2002/0129352 A1 | 9/2002 | Brodersen et al. | |
| 2003/0229890 A1* | 12/2003 | Lau | G06F 8/65 |
| | | | 717/168 |
| 2009/0064123 A1 | 3/2009 | Ramesh et al. | |
| 2014/0053146 A1 | 2/2014 | Freiter et al. | |
| 2014/0101647 A1 | 4/2014 | Huang | |
| 2015/0261518 A1* | 9/2015 | Viswanathan | G06F 8/71 |
| | | | 717/168 |
| 2015/0363185 A1* | 12/2015 | Garratt | G06F 8/65 |
| | | | 717/168 |
| 2016/0062761 A1* | 3/2016 | Muroyama | G06F 8/65 |
| | | | 717/171 |
| 2016/0125172 A1* | 5/2016 | Fuller | G06F 21/105 |
| | | | 726/26 |
| 2016/0266896 A1 | 9/2016 | Fan et al. | |
| 2017/0004184 A1* | 1/2017 | Jain | G06F 17/2735 |
| 2017/0154077 A1* | 6/2017 | Kang | G06F 7/20 |
| 2018/0060302 A1* | 3/2018 | Liang | G06F 17/277 |
| 2018/0067841 A1* | 3/2018 | Mahimkar | G06F 11/3668 |
| 2018/0173698 A1* | 6/2018 | Dubey | G06F 16/3347 |
| 2018/0302303 A1* | 10/2018 | Skovron | G06F 11/0709 |
| 2019/0171432 A1 | 6/2019 | Miller et al. | |

OTHER PUBLICATIONS

Hayden et al, "Evaluating Dynamic Software Update Safety Using Systematic Testing", [Online], 2012, pp. 1340-1354, [Retrieved from internet on May 17, 2019], <https://ieeexplore.ieee.org/stamp/stamp.jsp?tp=&arnumber=6035725> (Year: 2012).*

Cubranic et al, "Hipikat: Recommending Pertinent Software Development Artifacts", [Online], 2003, pp. 408-418, [Retrieved from internet on May 17, 2019], <http://delivery.acm.org/10.1145/780000/776866/p408-cubranic.pdf?ip=151.207.250.22&id=776866&acc=OPEN&key=C15944E53D0ACA63%2E4D4702B0C3E38B35%2E4D4> (Year: 2003).*

Zanardi et al, "Dynamic Updating of Online Recommender Systems via Feed-Forward Controllers", [Online], 2011, pp. 11-19, [Retrieved from Internet on Oct. 24, 2019], <http://delivery.acm.org/10.1145/1990000/1988011/p11-zanardi.pdf?ip=151.207.250.22&id=1988011&acc=ACTIVE%20SERVICE&key=C15944E53D0ACA63%> (Year: 2011).*

Hicks et al, "Dynamic Software Updating", [Online], 2003, pp. 1-46, [Retrieved from Internet on Oct. 24, 2019], <http://citeseerx.ist.psu.edu/viewdoc/download;jsessionid=72F596E798C99711EB16D82FC3511613?doi=10.1.1.188.675&rep=rep1&type=pdf> (Year: 2003).*

* cited by examiner

Example Key Terms 701

| TID | Items |
|---|---|
| 1. | KS_A, KS_B, KS_E, KS_F |
| 2. | KS_B, KS_G, KS_A, KS_H |
| 3. | KS_G, KS_H, KS_S |

FIG. 7

Example Recommendation 801

| No. | API Change | Overview | Impact Files |
|---|---|---|---|
| 2-1 | CustomFunctionDOB | dateOfBirth field value should not be in future date | AdminstartorApplicationScript.xml ExternalUsersApplicationScript.xml |

RECOMMENDATIONS FOR CUSTOM SOFTWARE UPGRADE BY COGNITIVE TECHNOLOGIES

BACKGROUND

The upgrading of a multi-tiered enterprise software for a computing system is a complicated process and comes with a high level of risk. Enterprise software often contain multiple components, and an upgrade can be applied at one component or multiple components. Upgrades of different components may also be applied by different vendors, increasing the complexity.

The components in the enterprise software can also be interrelated, and upgrading these interrelated components without considering the dependencies will result in upgrade failures and bugs. Upgrading these components is thus a challenging technical problem involving a high risk of errors that will negatively impact the functioning of the computing system.

SUMMARY

Disclosed herein is a method for creating recommendations for software upgrade of a multi-tiered software for a computing system, and a computer program product and system as specified in the independent claims. Embodiments of the present invention are given in the dependent claims. Embodiments of the present invention can be freely combined with each other if they are not mutually exclusive.

According to an embodiment of the present invention, in creating recommendations for software upgrades in a computing system, a natural language processing module of a software upgrade analyzer system receives risk analysis reports and a corresponding current application source code. The natural language processing module processes the risk analysis report and the current application source code to identify an application programming interface (API) key set containing a set of terms. A support vector machine of the software upgrade analyzer system identifies a set of key terms in the API key set. An association rule mining module of the software upgrade analyzer system calculates a support factor and a confidence factor for each key term combination of the set of key terms. The association rule mining module identifies a highest ranking key term combination based on the confidence factor for each key term combination. The software upgrade analyzer system outputs the highest ranking key combination as a software upgrade recommendation.

DETAILED DESCRIPTION

Figure 1:
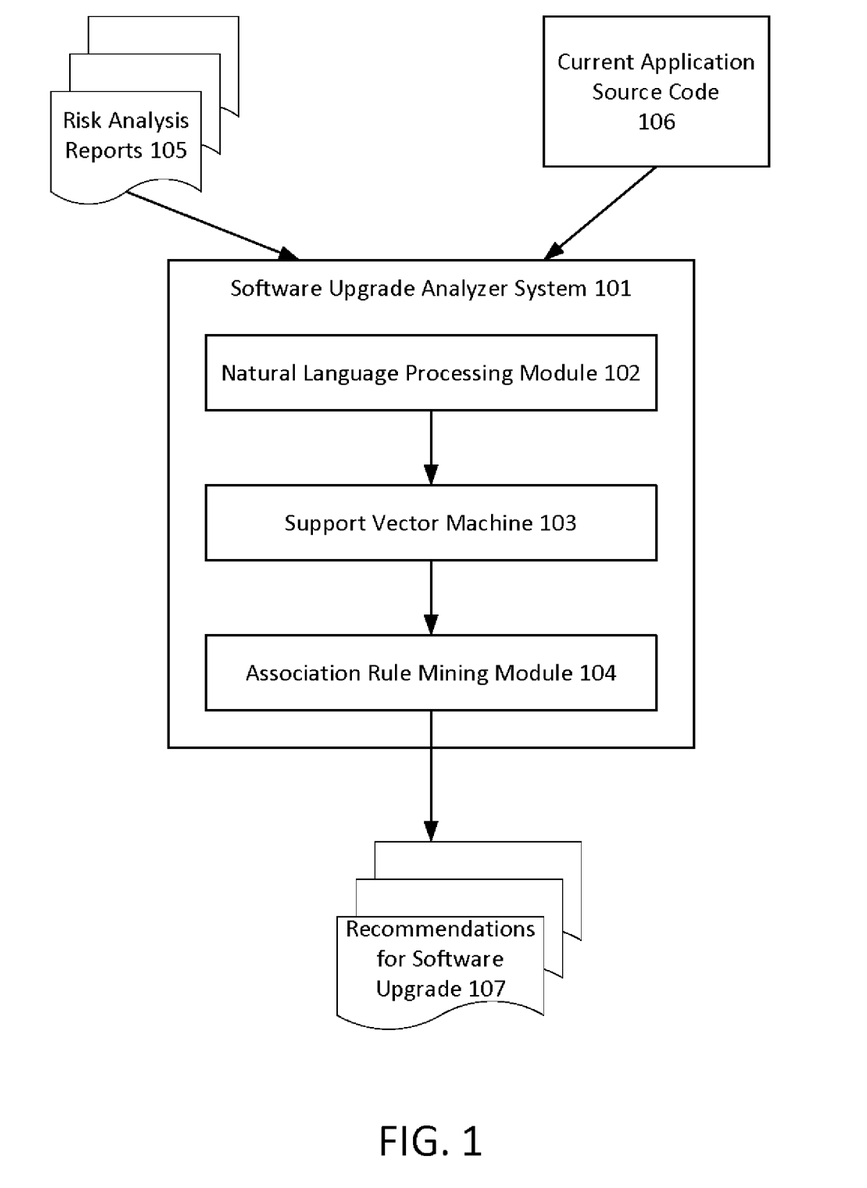
FIG. 1 illustrates a software upgrade analyzer system according to an exemplary embodiment of the present invention.

To address the technical problem of upgrading a multi-tiered software with integrated components, embodiments of the present invention uses a software upgrade analyzer system. FIG. 1 illustrates a software upgrade analyzer system according to an exemplary embodiment of the present invention. The software upgrade analyzer system 101 receives risk analysis reports 105 and a current application source code 106 as input. Risk analysis reports 105 can include documentation containing details of the upgrade to be applied to the current application source code 106 and the impacts on the code artifacts in the current application source code 106, such as information about application programming interface (API) changes, technical errors related to the API changes, functional gaps in an application source code due to the API changes, work arounds for the API changes, and other information associated with the API changes. The current application source code 106 contains components to be upgraded, not the source code for the upgrade itself. The software upgrade analyzer system 101 includes a natural language processing (NLP) module 102, a support vector machine (SVM) 103, and an association rule mining module 104, described further below.

Figure 2:
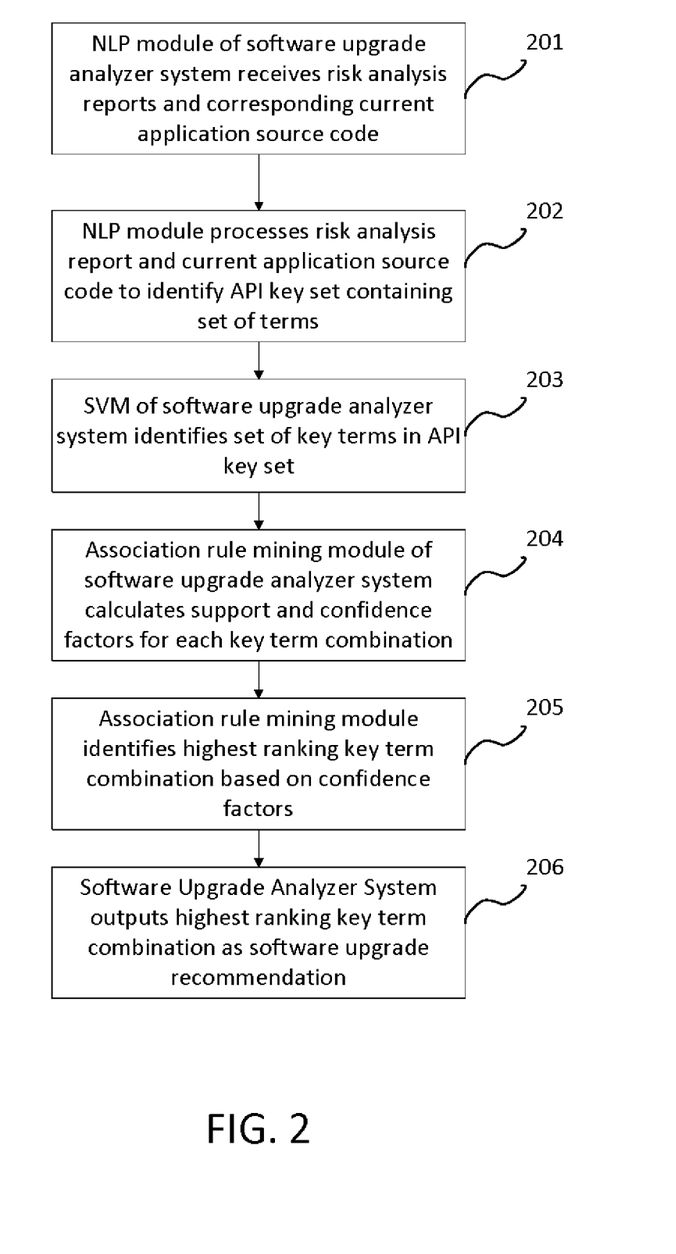
FIG. 2 illustrates a method for creating recommendations for software upgrades of a multi-tiered software for a computing system, according to an exemplary embodiment of the present invention.

FIG. 2 illustrates a method for creating recommendations for software upgrades of a multi-tiered software for a computing system, according to an exemplary embodiment of the present invention. The NLP module 102 of the software upgrade analyzer system 101 receives the risk analysis reports 105 and the corresponding current application source code 106 as input (201). The NLP module 102 processes the text in the risk analysis reports 105 and the current application source code 106 to identify an API key set containing a set of terms (202), as described further with reference to FIG. 3. The NLP module 102 outputs the API key set to the SVM 103 of the software upgrade analyzer system 101. The SVM 103 receives the API key set as input and identifies a set of key terms in the API key set (203), as described further with reference to FIG. 4. The SVM outputs the set of key terms to the association rule mining module 104 of the software upgrade analyzer system 101. The association rule mining module 104 receives the set of key terms as input and calculates the support and confidence factors for each key term combination (204), as described further with reference to FIG. 5. The association rule mining module 104 then identifies the highest ranking key term combination based on the confidence factors (205). The software upgrade analyzer system 101 outputs the highest ranking key term combination as a software upgrade recommendation 107 (206).

Figure 3:
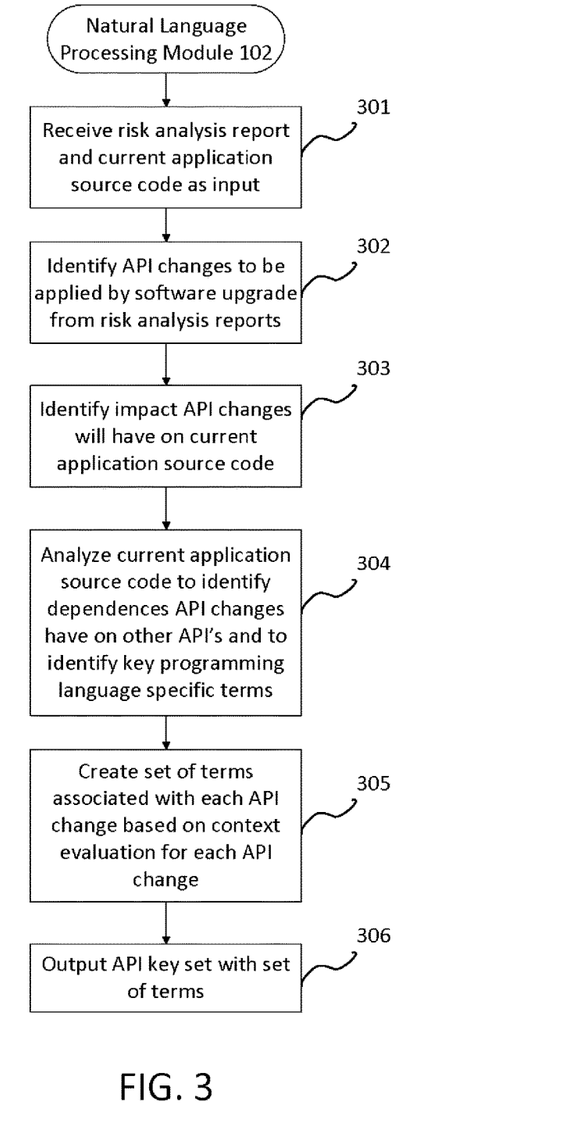
FIG. 3 illustrates in more detail the natural language processing module of the software upgrade analyzer system, according to an exemplary embodiment of the present invention.

FIG. 3 illustrates in more detail the natural language processing module of the software upgrade analyzer system, according to an exemplary embodiment of the present invention. The NLP module 102 receives the risk analysis reports 105 and the current application source code 106 as input (301). The NLP module 102 uses both natural language understanding and natural language generation features of natural language processing. The NLP module 102 identifies API changes to be applied by the software upgrade from the risk analysis reports (302), which serves as the primary information to identify the impact on the current application source code 106 that the API changes will have (303). The NLP module 102 analyzes the current application source code 106 to identify dependences the API changes have on other API's and to identify key programming language specific terms used in the current application source code 106 (304). The NLP module 102 creates a set of terms associated with each API change based on a context evaluation for each API change (305). The NLP module 102 outputs the set of terms as an API key set (306).

Figure 4:
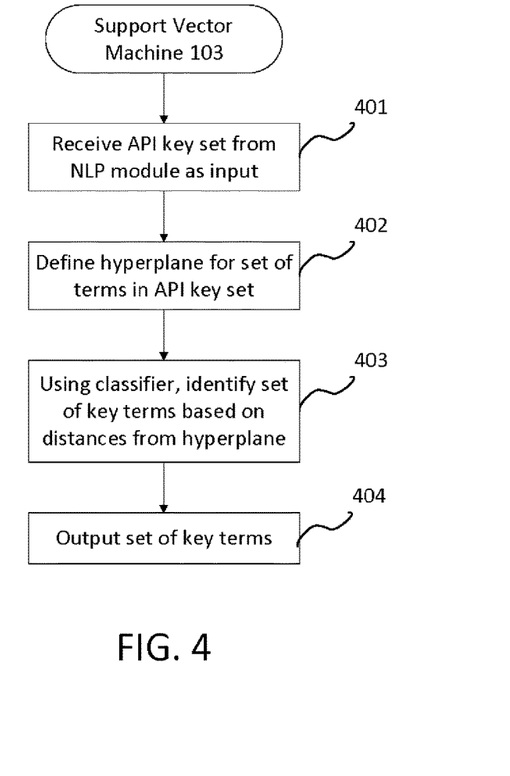
FIG. 4 illustrates in more detail the support vector machine of the software upgrade analyzer system, according to an exemplary embodiment of the present invention.

FIG. 4 illustrates in more detail the support vector machine of the software upgrade analyzer system, according to an exemplary embodiment of the present invention. The SVM 103 receives the API key set from the NLP module 102 as input (401). The SVM 103 defines a hyperplane for the set of terms in the API key set (402). Using a classifier, the SVM 103 identifies a set of key terms in the API key set based on their respective distances from the hyperplane (403). The set of key terms includes terms which are determined to be significant for the API changes. In this exemplary embodiment, the SVM 103 derives a classifier, which is a mathematical function that will enable the classification or grouping of the terms according to the hyperplane margin. The classifier is continually refined by increasing the corpus of training data, that may be from the output of the NLP module 102. The SVM 103 outputs the set of key terms (404).

Figure 5:
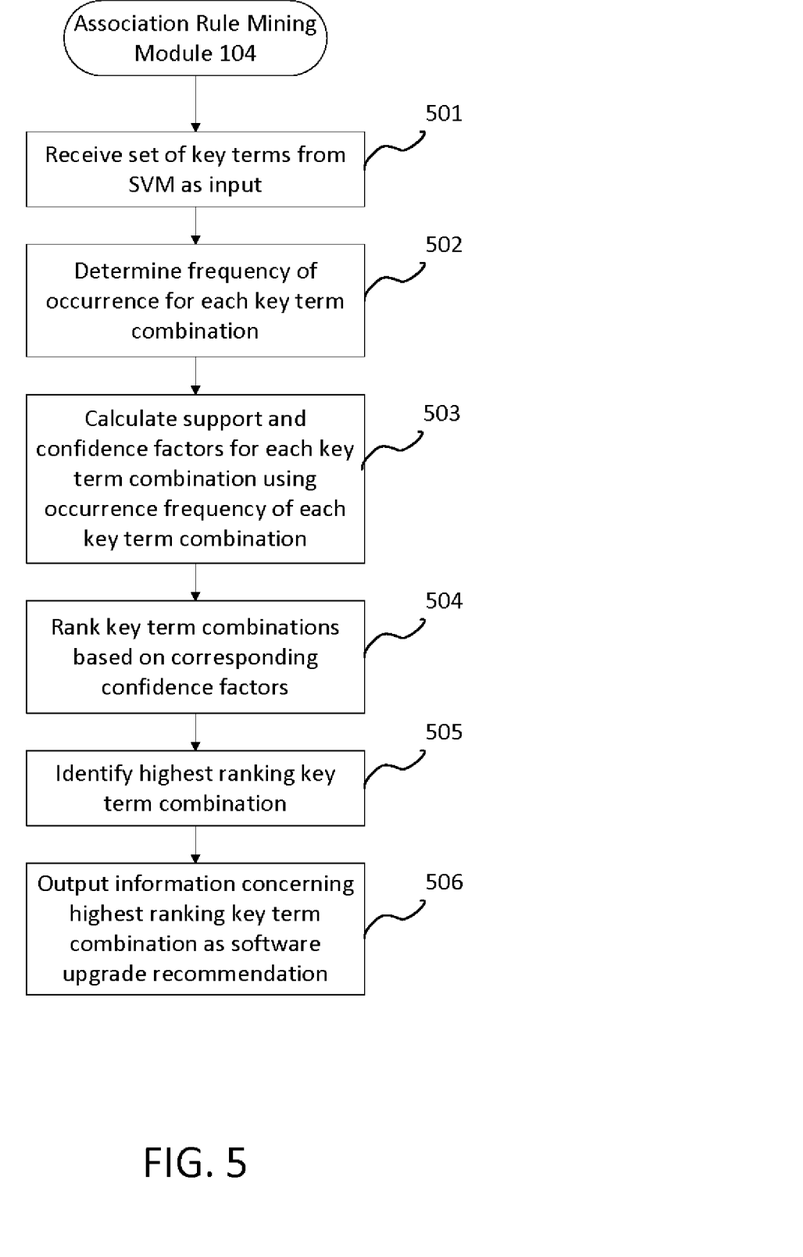
FIG. 5 illustrates in more detail the association rule mining module of the software upgrade analyzer system, according to an exemplary embodiment of the present invention.

FIG. 5 illustrates in more detail the association rule mining module of the software upgrade analyzer system, according to an exemplary embodiment of the present invention. The goal of the association rule mining module 104 is to find frequently co-occurring associations among the set of key terms, i.e., key term combinations that occur more often than would be expected from a random sampling of all possibilities. The association rule mining module 104 receives the set of key terms from the SVM 103 as input (501). The association rule mining module 104 determines the frequency of occurrence for each key term combination (502). The association rule mining module 104 calculates support and confidence factors for each key term combination using the occurrence frequency of each key term combination (503). The support factor indicates how frequently a key term combination appears in the set. The confidence factor, using the support factor, indicates how often a predefined association rule for the key term combination has been found to be true. The association rule mining module 104 ranks the key term combinations based on their corresponding confidence factors (504) and identifies the highest ranking key term combination (505). Other constraint factors may also be used. For example, the association rule mining module 104 may calculate lift and conviction factors for each key term combination using the support and confidence factors. The lift factor indicates a ratio of the support for a key term combination to that expected if the key terms in the combination were independent. In other words, lift indicates how much the co-occurrence of two key terms are related. The conviction factor indicates a ratio of an expected frequency that one key term occurs without the other key term, i.e., the frequency that the association rule makes an incorrect prediction. The conviction factors are then used to identify the highest ranking key term combination. The association rule mining module 104 outputs the highest ranking key term combination as a software upgrade recommendation 107 for the API (506).

Figure 6:
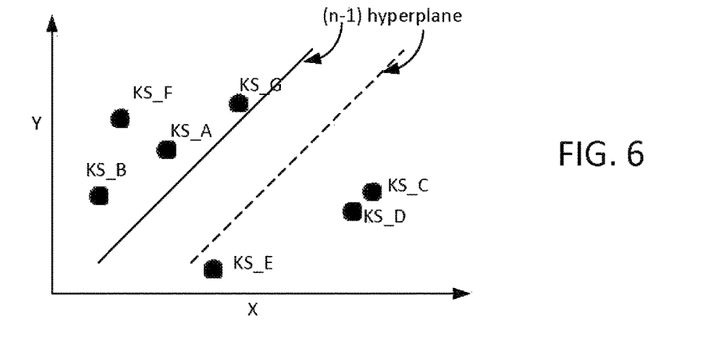
FIGS. 6-8 illustrate an example of the method for creating recommendations for software upgrades in a computing system, according to an exemplary embodiment of the present invention.
Figure 7:
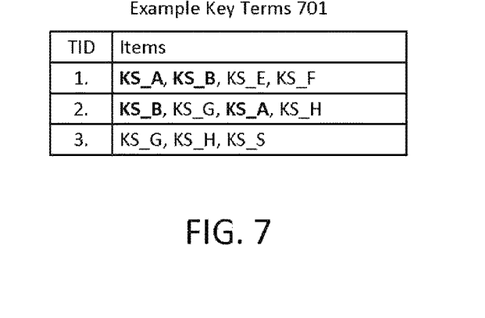
Figure 8:
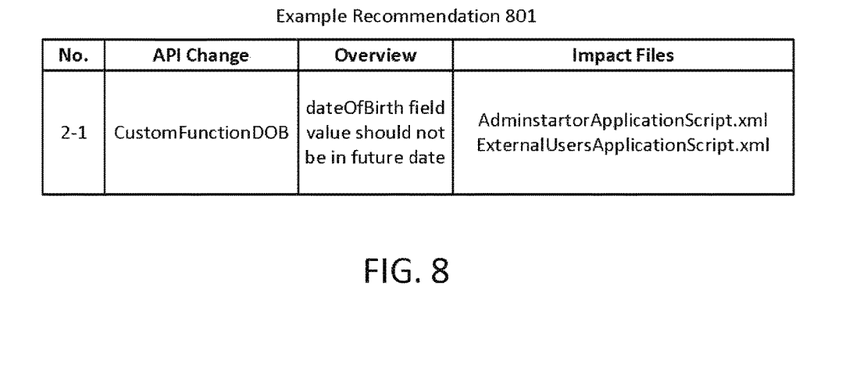

FIGS. 6-8 illustrate an example of the method for creating recommendations for software upgrades in a computing system, according to an exemplary embodiment of the present invention. Assume that as part of the software upgrade, the risk analysis reports 105 indicate there is a change in logic of a custom function, CustomFunctionDOB.java, which is called from ExternalUsersApplicationScript.xml while an application is submitted by external users of an external user portal. New conditional statements are added to validate the values entered for the DOB field, such as the DOB field should accept a future date as input. As part of the software upgrade, there is also a change in the logic of the custom function, CustomFunctionDOB.java, which is called from AdministratorApplicationScript.xml while an application is submitted by external users of an administrator user portal. New conditional statements are added to validate the values entered for a DOB field, such as the DOB field should accept future dates. Referring to FIG. 2, the above text and the current application source code 106, CustomFunctionDOB.java, ExternalUsersApplicationScript.xml, and AdministratorApplicationScript.xml are input to the NLP module 102 (201). The NLP module 102 processes the text and the current application source code 106 to render the context and identify the API key set (202). Assume that the API key set is to be in the following format:

KS_A={KTa, KTb, KTc, KTd ... }
KS_B={KTa, KTb, KTc, KTd, KTe, KTf, KTg ... }, where KS_A includes terms for API change A, and KS_B includes terms for API change B. For the example terms above, the API key set contains the following:

KS_A={class: CustomFunctionDOB, Method: processDOB, attribute: dateOfBirth Change: conditional statement to check dateOfBirth value not in future date, invocation: AdminstratorApplicationScript.xml}

KS_B={class: CustomFunctionDOB, Method: processDOB, attribute: dateOfBirth Change: conditional statement to check dateOfBirth value not in future date, invocation: ExternalUsersApplicationScript.xml}

The SVM 103 receives the above API key set as input. The SVM 103 identifies the key terms in the API key set (203). The SVM 103 segregates the API key set based on SVM constructed hyperplanes. FIG. 6 illustrates an example of the hyperplanes constructed for the above API key set. The SVM 103 constructs the appropriate n−1 hyperplanes that will be derived to classify the terms in the API key set based on their respective distances from the hyperplanes in order to identify the key terms. Assume that the key terms are grouped or classified in the following format:

Class c1={KS_B, KS_A, KS_G, KS_H, KS_E, KS_F, ... }
Class c2={KS_E, KS_C, KS_D, ... }

FIG. 7 illustrates an example of key terms 701, with the "TID" being a term ID, functioning as a primary key for the classes or group of terms. The set of key terms are output from the SVM 103 to the association rule mining module 104.

The association rule mining module 104 receives the key terms 701. The association rule mining module 104 calculates the support and confidence factors for each key term combination (204). For the example key set combination {KS_A, KS_B}, the frequency of occurrence is 2. The support factor=support count/total number of elements, thus the support factor for the key term combination {KS_A, KS_B} is 2/6 or 0.33334. The confidence factor=support count/number of occurrences of the key term combination, thus the confidence factor for the key term combination {KS_A, KS_B}=2/2 or 1. Assume that the association rule mining module 104 identifies this key term combination confidence factor as the highest ranking key term combination (205). This key term combination is output as the software upgrade recommendation (206). FIG. 8 illustrates an example recommendation 801 for the key term combination {KS_A, KS_B}.

Figure 9:
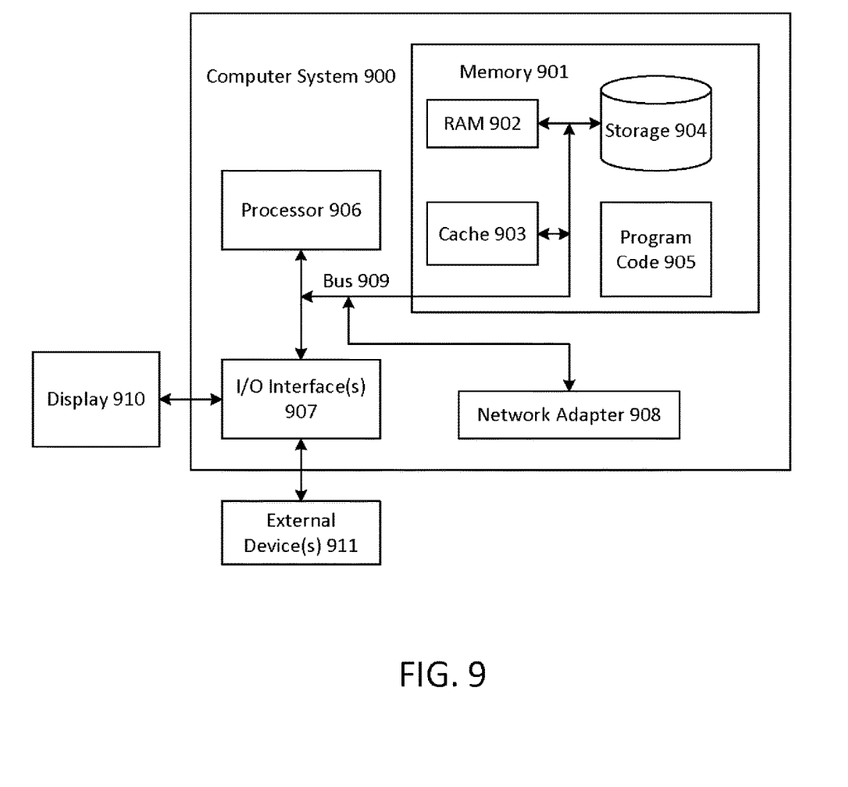
FIG. 9 illustrates a computer system, one or more of which implements the exemplary embodiments of the present invention.

FIG. 9 illustrates a computer system, one or more of which implements the exemplary embodiments of the present invention. The computer system 900 is operationally coupled to a processor or processing units 906, a memory 901, and a bus 909 that couples various system components, including the memory 901 to the processor 906. The bus 909 represents one or more of any of several types of bus structure, including a memory bus or memory controller, a peripheral bus, an accelerated graphics port, and a processor or local bus using any of a variety of bus architectures. The memory 901 may include computer readable media in the form of volatile memory, such as random access memory (RAM) 902 or cache memory 903, or non-volatile storage media 904. The memory 901 may include at least one program product having a set of at least one program code module 905 that are configured to carry out the functions of embodiment of the present invention when executed by the processor 906. The computer system 900 may also communicate with one or more external devices 911, such as a display 910, via I/O interfaces 907. The computer system 900 may communicate with one or more networks via network adapter 908.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for upgrading application source code in a computing system comprising:
   receiving, by a natural language processing module of a software upgrade analyzer system, risk analysis reports comprising information on a software upgrade to be applied to a current application source code and the current application source code;
   processing, by the natural language processing module, the risk analysis report and the current application source code to identify an application programming interface (API) key set containing a set of terms, comprising:
   identifying API changes to be applied by the software upgrade from the risk analysis reports;
   identifying impacts the API changes will have on the current application source code;
   analyzing the current application source code to identify dependences the API changes have on other API's and to identify key programming language specific terms;
   creating the set of terms associated with each API change based on a context evaluation for each API change;
   identifying, by a support vector machine of the software upgrade analyzer system, a set of key terms in the API key set;
   calculating, by an association rule mining module of the software upgrade analyzer system, a support factor and a confidence factor for each key term combination of the set of key terms;
   identifying, by the association rule mining module, a highest ranking key term combination based on the confidence factor for each key term combination; and
   outputting, as a software upgrade recommendation for applying the software upgrade, by the software upgrade analyzer system, the highest ranking key term combination and an associated combination of components in the application source code impacted by the API changes.

2. The method of claim 1, wherein the calculating of the support factor and the confidence factor for each key term combination of the set of key terms comprises:
   receiving, by the association rule mining module, the set of key terms from the support vector machine;
   determining, by the association rule mining module, a frequency of occurrence for each key term combination; and
   calculating, by the association rule mining module, the support factor and the confidence factor for each key term combination using the occurrence frequency of each key term combination.

3. The method of claim 2, wherein the identifying of the highest ranking key term combination based on the confidence factor for each key term combination comprises:
   ranking, by the association rule mining module, the key term combinations based on the corresponding confidence factors; and
   identifying, by the association rule mining module, the highest ranking key term combination based on the corresponding confidence factors.

4. The method of claim 1, wherein the risk analysis reports consist of a group comprising one or more of the following: information about API changes; technical errors related to the API changes; functional gaps in an application source code due to the API changes; and work arounds for the API changes.

5. The method of claim 1, wherein the calculating of the support factor and the confidence factor for each key term combination of the set of key terms and the identifying of the highest ranking key term combination based on the confidence factor for each key term combination comprise:
   further calculating, by the association rule mining module, a lift factor and a conviction factor for each key term combination using the support factor and the conviction factor; and
   identifying, by the association rule mining module, the highest ranking key term combination based on the conviction factor for each key term combination.

6. A computer program product for upgrading application source code in a computing system, the computer program product comprising a computer readable storage medium having program instructions embodied therewith, the program instructions executable by one or more processors to cause the one or more processors to:
   receive, by a natural language processing module of a software upgrade analyzer system, risk analysis reports comprising information on a software upgrade to be applied to a current application source code and the current application source code;
   process, by the natural language processing module, the risk analysis report and the current application source code to identify an application programming interface (API) key set containing a set of terms, comprising:
   identify API changes to be applied by the software upgrade from the risk analysis reports;
   identify impacts the API changes will have on the current application source code;

analyze the current application source code to identify dependences the API changes have on other API's and to identify key programming language specific terms;

create the set of terms associated with each API change based on a context evaluation for each API change;

identify, by a support vector machine of the software upgrade analyzer system, a set of key terms in the API key set;

calculate, by an association rule mining module of the software upgrade analyzer system, a support factor and a confidence factor for each key term combination of the set of key terms;

identify, by the association rule mining module, a highest ranking key term combination based on the confidence factor for each key term combination; and output, as a software upgrade recommendation for applying the software upgrade, by the software upgrade analyzer system, the highest ranking key term combination and an associated combination of components in the application source code impacted by the API changes.

7. The computer program product of claim 6, wherein in calculating the support factor and the confidence factor for each key term combination of the set of key terms, the one or more processors are further caused to:

receive, by the association rule mining module, the set of key terms from the support vector machine;

determine, by the association rule mining module, a frequency of occurrence for each key term combination; and calculate, by the association rule mining module, the support factor and the confidence factor for each key term combination using the occurrence frequency of each key term combination.

8. The computer program product of claim 7, wherein in identifying the highest ranking key term combination based on the confidence factor for each key term combination, the one or more processors are further caused to:

rank, by the association rule mining module, the key term combinations based on the corresponding confidence factors; and identify, by the association rule mining module, the highest ranking key term combination based on the corresponding confidence factors.

9. The computer program product of claim 6, wherein the risk analysis reports consist of a group comprising one or more of the following: information about API changes; technical errors related to the API changes; functional gaps in an application source code due to the API changes; and work arounds for the API changes.

10. The computer program product of claim 6, wherein in calculating the support factor and the confidence factor for each key term combination of the key terms and in identifying the highest ranking key term combination based on the confidence factor for each key term combination, the one or more processors are further caused to:

further calculate, by the association rule mining module, a lift factor and a conviction factor for each key term combination using the support factor and the conviction factor; and identify, by the association rule mining module, the highest ranking key term combination based on the conviction factor for each key term combination.

11. A system for upgrading application source code, comprising:

one or more processors; and a computer readable storage medium having program instructions embodied therewith, the program instructions executable by one or more processors to cause the one or more processors to:

receive, by a natural language processing module of a software upgrade analyzer system, risk analysis reports comprising information on a software upgrade to be applied to a current application source code and the current application source code;

process, by the natural language processing module, the risk analysis report and the current application source code to identify an application programming interface (API) key set containing a set terms, comprising:

identify API changes to be applied by the software upgrade from the risk analysis reports;

identify impacts the API changes will have on the current application source code;

analyze the current application source code to identify dependences the API changes have on other API's and to identify key programming language specific terms;

create the set of terms associated with each API change based on a context evaluation for each API change;

identify, by a support vector machine of the software upgrade analyzer system, a set of key terms in the API key set;

calculate, by an association rule mining module of the software upgrade analyzer system, a support factor and a confidence factor for each key term combination of the set of key terms;

identify, by the association rule mining module, a highest ranking key term combination based on the confidence factor for each key term combination; and output, as a software upgrade recommendation for applying the software upgrade, by the software upgrade analyzer system, the highest ranking key term combination and an associated combination of components in the application source code impacted by the API changes.

12. The system of claim 11, wherein in calculating the support factor and the confidence factor for each key term combination of the set of key terms, the one or more processors are further caused to:

receive, by the association rule mining module, the set of key terms from the support vector machine;

determine, by the association rule mining module, a frequency of occurrence for each key term combination; and calculate, by the association rule mining module, the support factor and the confidence factor for each key term combination using the occurrence frequency of each key term combination.

13. The system of claim 12, wherein in identifying the highest ranking key term combination based on the confidence factor for each key term combination, the one or more processors are further caused to:

rank, by the association rule mining module, the key term combinations based on the corresponding confidence factors; and identify, by the association rule mining module, the highest ranking key term combination based on the corresponding confidence factors.

14. The system of claim 11, wherein the risk analysis reports consist of a group comprising one or more of the following: information about API changes; technical errors related to the API changes; functional gaps in an application source code due to the API changes; and work arounds for the API changes.

* * * * *